United States Patent
Force et al.

(10) Patent No.: US 8,129,485 B2
(45) Date of Patent: Mar. 6, 2012

(54) INTEGRATED HYDROCARBONS FEED STRIPPER AND METHOD OF USING THE SAME

(75) Inventors: Randall L. Force, Charleston, WV (US); James L. Swecker, Clendenin, WV (US); Kevin D. Roy, Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/744,245

(22) PCT Filed: Nov. 24, 2008

(86) PCT No.: PCT/US2008/013056
§ 371 (c)(1),
(2), (4) Date: Jun. 13, 2011

(87) PCT Pub. No.: WO2009/070261
PCT Pub. Date: Jun. 4, 2009

(65) Prior Publication Data
US 2011/0237855 A1 Sep. 29, 2011

Related U.S. Application Data

(60) Provisional application No. 61/004,403, filed on Nov. 27, 2007.

(51) Int. Cl.
*C08F 2/00* (2006.01)
*B01D 3/00* (2006.01)
*C08F 210/08* (2006.01)

(52) U.S. Cl. ............ 526/67; 526/77; 526/912; 585/518; 202/158

(58) Field of Classification Search .................... 526/67, 526/77, 912; 202/158; 585/518
See application file for complete search history.

(56) References Cited

U.S. PATENT DOCUMENTS

| | | | |
|---|---|---|---|
| 3,450,183 A | 6/1969 | Hinton | |
| 3,594,356 A | 7/1971 | Hinton | |
| 4,188,793 A | 2/1980 | Watson et al. | |
| 4,197,399 A | 4/1980 | Noel et al. | |
| 4,372,758 A | 2/1983 | Bobst et al. | |
| 4,666,998 A * | 5/1987 | Hagerty | 526/68 |
| 4,690,702 A | 9/1987 | Paradowski et al. | |
| 4,727,723 A | 3/1988 | Durr | |
| 5,035,732 A | 7/1991 | McCue | |
| 5,266,276 A | 11/1993 | Chinh et al. | |
| 5,352,749 A | 10/1994 | DeChellis et al. | |
| 5,376,742 A | 12/1994 | Krause | |
| 5,391,656 A | 2/1995 | Campbell et al. | |
| 5,405,922 A | 4/1995 | DeChellis et al. | |
| 5,421,167 A | 6/1995 | Verma | |
| 5,436,304 A | 7/1995 | Griffin et al. | |
| 5,497,626 A | 3/1996 | Howard et al. | |
| 5,626,034 A | 5/1997 | Manley et al. | |

(Continued)

FOREIGN PATENT DOCUMENTS

EP 549252 A 6/1993

(Continued)

Primary Examiner — Fred M Teskin

(57) ABSTRACT

Systems and methods for removing a volatile catalyst poison from a liquid hydrocarbon are provided. In one embodiment, a process vent (106) can be introduced to a vent recovery system (108) to provide a recycle gas (110). A first portion of the recycle gas (112) and a liquid hydrocarbon (102) can be introduced to a stripper column (104) to provide a stripper vent gas (114) and a degassed liquid hydrocarbon (116) that can be introduced to a polymerization process.

43 Claims, 2 Drawing Sheets

U.S. PATENT DOCUMENTS

| | | |
|---|---|---|
| 5,741,350 A | 4/1998 | Rowles et al. |
| 5,769,927 A | 6/1998 | Gottschlich et al. |
| 5,979,177 A | 11/1999 | Sumner et al. |
| 6,063,877 A | 5/2000 | Kocian et al. |
| 6,560,989 B1 | 5/2003 | Roberts et al. |
| 6,576,043 B2 | 6/2003 | Zwilling et al. |
| 6,576,805 B2 | 6/2003 | Keady et al. |
| 6,706,857 B2 | 3/2004 | Golden et al. |
| 6,712,880 B2 | 3/2004 | Foglietta et al. |
| 6,829,906 B2 | 12/2004 | Beam |
| 6,987,152 B1 * | 1/2006 | Eisinger et al. .......... 526/77 |
| 7,128,827 B2 | 10/2006 | Tallman et al. |
| 2005/0229634 A1 | 10/2005 | Huebel et al. |

FOREIGN PATENT DOCUMENTS

| | | |
|---|---|---|
| WO | WO 00/53306 | 9/2000 |
| WO | WO 03/040197 | 5/2003 |
| WO | WO 2004/007566 | 1/2004 |

* cited by examiner

INTEGRATED HYDROCARBONS FEED STRIPPER AND METHOD OF USING THE SAME

CROSS REFERENCE TO RELATED APPLICATIONS

This application is a National Stage entry under 35 U.S.C. §371 of International Application No. PCT/US2008/013056, filed Nov. 24, 2008, and claims the benefit of Ser. No. 61/004,403, filed Nov. 27, 2007, the disclosures of which are incorporated by reference in their entirety.

FIELD OF THE INVENTION

The invention generally relates to a method and system for removing volatiles from liquid hydrocarbons being fed to a polyolefin polymerization system. More specifically, the invention generally relates to a system and method for integrating the removal of volatiles from a liquid hydrocarbon feed to the polyolefin polymerization system and the recovery of hydrocarbons from a polymerization process vent stream.

BACKGROUND

Various methods of removal of volatile catalyst poisons, for example, oxygen, carbon dioxide, and carbon monoxide, from liquid olefins and saturated liquid hydrocarbons fed to the polyolefin polymerization system are practiced. One method for removing volatile catalyst poisons from a liquid hydrocarbons feed involves distillation in packed or trayed columns using reboilers. These systems are investment intensive, for example, often including a column, reboiler, condenser, surge tank, aftercooler, and feed pump required for each liquid hydrocarbon stream. These systems are also relatively expensive to operate due to the steam and cooling water requirements. Furthermore, some of the vaporized hydrocarbon is typically lost in the vent as the volatile catalyst poisons are vented from the system.

Another method for removing volatile poisons from a liquid hydrocarbon feed uses a packed bed or column with liquid flowing downward through the bed while an inert gas, such as nitrogen, flows upward. As the inert gas flows upward, volatile catalyst poisons transfer from the liquid into the inert gas. The inert gas is then vented from an upper portion of the bed or column (the column vent stream) and is typically sent to a flare. This system typically requires less investment than a reboiler system, but is relatively inefficient because of the amount of hydrocarbons that are lost in the vent stream exiting the column or bed. The vent losses are especially high for relatively high vapor pressure hydrocarbons, such as butene.

Another method for removing volatile poisons from a liquid hydrocarbon feed uses an inert gas, such as nitrogen, sparged up through a vessel containing the liquid hydrocarbon. This method generally has low investment, but is relatively inefficient in removing volatile poisons and results in relatively high hydrocarbon losses.

In some methods, such as packed bed and sparging systems, the column or vessel vent stream can cause problems in the flare system due to a relatively high concentration of inert gas in the stream, which results in low energy content (referred to as BTU value) and problems with efficient burning of the contained hydrocarbons. In some cases, a hydrocarbon, such as methane, must be added to the flare stream to raise the BTU content to allow efficient burning in the flare. In other cases, the column vent stream is sent to a hydrocarbons distillation or cracking unit to recover the contained hydrocarbons. This also presents problems for the distillation or cracking unit due to the high inert content.

Additionally, many polyolefin polymerization systems use more than one liquid hydrocarbon feed. For example, a polyethylene production unit may feed liquid propylene, butene, hexene, octene, or other liquid alkenes as a comonomer. Common comonomers employed in gas phase reactors are 1-butene, 1-hexene, and 4-methyl-1-pentene. In addition, slurry reaction systems may feed saturated aliphatic and aromatic hydrocarbons, such as pentane, hexane, heptane, octane, toluene, xylene, and cyclohexane and mixtures of solvents. Gas-phase reaction systems may feed alkenes as comonomer and an inert hydrocarbon, such as an alkane, or cycloalkane as an induced condensing agent(s) (ICAs) or simply as an agent to raise the molecular weight or specific heat of the gas. The most common types of ICAs are isopentane and n-hexane, but isobutane, or other hydrocarbons (or halogenated hydrocarbons, e.g., HFCs) of similar boiling points may also be used. The use of ICAs is further explained in U.S. Pat. Nos. 5,352,749, 5,405,922, and 5,436,304.

Many current polyolefin reactor systems typically utilize one stripping system for each liquid hydrocarbon fed to the system. For example, a polyethylene production system may have a butene comonomer stripping system, a hexene comonomer stripping system, and an ICA stripping system. This typically requires investing in three independent columns or packed bed systems. Furthermore, each of the three stripping systems consume energy and/or inert gas independently, and generates three independent vent streams, each containing inert gases, which are sent to a flare system or processed by other facilities.

The polymers produced contain residual gaseous or liquid alkenes and alkanes that are removed from the resin in purging systems. There are various techniques for removing volatile hydrocarbons from polymers. See, for example, U.S. Pat. Nos. 5,749,412, 5,376,742, 4,372,758, 4,197,399, 3,594,356, and 3,450,183, in which generally columnar vessels are used as a purger, referred to as a polymer purge bin, or product purge bin. The purging processes usually comprise conveying the solid polymer to a polymer purge bin and contacting the polymer in the purge bin with a countercurrent inert gas purge stream to strip away the volatile hydrocarbons contained in the polymer.

To increase unit efficiency and reduce environmental emissions, a vent recovery system is typically utilized to recover hydrocarbons from the mixed hydrocarbon/inert purge gas stream exiting the purge vessel. Methods of recovering hydrocarbons from the polymerization unit vent stream include: a) compression and condensation with water and/or mechanical refrigeration (for example cooling to −10° C.); and b) separation via pressure swing absorption (PSA) or membranes.

In a compression and condensation system, such as described in, for example, U.S. Pat. No. 5,391,656, a polymer purge bin vent stream, which contains inert gases, such as nitrogen, and various monomers, is treated in a series of steps that include: cooling to condense a portion of the reactor gas stream; separating and recycling the condensed liquids such as hexene, hexane, butene, isopentane, and the like from the remaining non-condensable gases; compressing the non-condensable gases; cooling the compressed stream to promote further condensing, further liquid/gas separation, and further recycle of condensed monomers. The compression and cooling vent recovery system provide recovery of a high percentage of the heavier contained hydrocarbons through the condensation process.

Another recovery method contemplated in the art involves cryogenic vent recovery, wherein condensation of monomer from vent streams containing nitrogen is accomplished by vaporization of liquid nitrogen (either with or without vent compression and to temperatures as low as and below −100° C.). Commercially available cryogenic vent recovery systems used for cryogenic vent recovery typically rely on importing liquid nitrogen from another facility at site, importing liquid nitrogen from an off-site facility, or sending the vent to an off site to recover the condensable hydrocarbons as a refuse stream.

U.S. Pat. No. 6,576,043 describes a process for the separation of a gas mixture comprising nitrogen and at least one hydrocarbon from a polyolefin production plant in which the gas mixture is separated into hydrocarbon and nitrogen streams in an adsorbent bed by a Pressure Swing Adsorption (PSA) process.

U.S. Pat. No. 6,706,857 describes a process for the production of a polyolefin, wherein an olefin monomer is polymerized and a residual monomer is recovered from a gas stream comprising the monomer and nitrogen. This process also uses a PSA process.

U.S. Pat. No. 5,769,927 describes a process for treating a purge vent stream from a polymer manufacturing operation by condensation, flash evaporation, and membrane separation.

U.S. Pat. No. 6,829,906 relates to recovering volatile compounds and inert gases from vessels, such as barges, that need vapor de-pressuring for changing products or human entry for servicing or inspection, liquid filling, or liquid unloading.

U.S. Pat. No. 4,690,702 discloses a method and apparatus for cryogenic fractionation of a gaseous feed employing a contact purifying refrigeration column and refrigerating fluid circuit.

U.S. Pat. No. 5,741,350 discloses a method and apparatus for recovery of hydrocarbons from polyalkene product purge gas, wherein the alkene monomer is condensed and separated at low temperature from the inert gas, and recycled to the polymerization process.

Other background references include U.S. Pat. Nos. 4,188,793, 4,727,723, 5,035,732, 5,266,276, 5,421,167, 5,497,626, 5,626,034, 5,979,177, 6,063,877, 6,560,989, 6,576,805, 6,712,880, and 7,128,827; U.S. Patent Application Publication Nos. 2005/0229634 and 2005/0159122; and EP-549252-A.

Another consideration in polyolefin polymerization systems is the removal of non-condensable gas from the polymerization system. Removal of non-condensable gases may be required due to a slow increase in non-condensable gas concentration, for example ethane, over time as the system operates. Removal of non-condensable gases may be also be required due to transitioning the reactor from producing a product using a higher concentration of non-condensable gases used in the reaction, for example hydrogen, to a product that uses a lower concentration of the non-condensable gas. In either case, reactor gas containing valuable monomers and comonomers are often vented from the polymerization system in order to remove the non-condensable gases. In some cases, considerable volumes of reactor gases must be vented in order to remove the desired amount of non-condensable gases, resulting in significant monomer and comonomer losses.

In view of the considerations discussed above, there exists a need to provide a cost effective method of removing volatile catalyst poisons from multiple liquid hydrocarbon feed streams being fed to polyolefin production systems. Furthermore, there exists a need to reduce the levels of non-condensable gases in the polymerization system without losing valuable monomers and/or comonomers contained in the reactor gas. Still further, there exists a need to reduce the hydrocarbons vented to a flare or recovery systems from liquid hydrocarbon stripping systems. Finally, there exists a need to reduce the amount of low-energy gases, such as nitrogen, being sent to the flare in polyolefin production systems.

SUMMARY

In a class of embodiments, the current invention provides for a method and system for integrating the removal of volatile catalyst poisons from a liquid hydrocarbon feed to a polyolefin polymerization system and the recovery of hydrocarbons from a polyolefin production process vent stream. The integrated method and system for removing volatile catalyst poisons may also provide the ability to remove non-condensable gases from the polymerization system while saving the valuable monomer or comonomer contained in the reactor gas.

In one class of embodiments, the invention provides for a method for removing a volatile catalyst poison from a liquid hydrocarbon feed to a polymerization process, the method comprising the steps of: a) feeding a fresh liquid hydrocarbon to a stripper column; b) providing a process vent from a polymerization process; c) recycling the process vent in a vent recovery system to form a recycle gas; d) feeding a first portion of the recycle gas to the stripper column; e) removing a stripper vent gas and a stripper column tail from the stripper column; and f) feeding a degassed liquid hydrocarbon comprising the stripper column tail to the polymerization process.

One embodiment comprises the step of combining at least two independent liquid hydrocarbon streams to form the fresh liquid hydrocarbon.

In one embodiment, the fresh liquid hydrocarbon comprises a liquid alkene, liquid alkane, or liquid cycloalkane. In another embodiment, the fresh liquid hydrocarbon comprises a $C_3$ alkene, $C_4$ alkene, $C_5$ alkene, $C_6$ alkene, $C_8$ alkene, a $C_4$ alkane, $C_5$ alkane, $C_6$ alkane, $C_8$ alkane, or combination thereof.

In another embodiment of the method, the polymerization process is a polyethylene or polypropylene polymerization process.

In one embodiment, the stripper vent gas is fed to a vent recovery system.

In another embodiment, a process vent liquid is separated from the process vent before recycling the process vent.

In yet another embodiment the process vent liquid is combined with the stripper column tail to form the degassed liquid hydrocarbon.

In at least one embodiment, the stripper column comprises a chilled condenser in an upper portion of the stripper column, and the recycle liquid is fed to the polymerization process.

In one embodiment, the recycling step comprises the steps of: a) compressing the process vent in the vent recovery system to form a compressed recycle fluid; and b) separating the compressed recycle fluid to form the recycle gas and a recycle liquid. In a further embodiment, the method comprises feeding the recycle liquid to the stripper column, or combining the recycle liquid with the stripper column tail to form the degassed hydrocarbon liquid.

In another embodiment, a second portion of the recycle gas is fed to the polymerization process, a product conveying system, a flare, or a combination thereof.

One embodiment of the method also comprises feeding a fresh nitrogen gas to a lower portion of the stripper column, wherein the fresh nitrogen gas is fed in combination with the recycle gas.

In another embodiment, the build-up of a light gas in the polymerization process, the process vent, or the recycle gas is controlled by venting a portion of the stripper vent gas, the process vent, or the recycle gas to a flare or a recovery system.

In yet another embodiment, a targeted catalyst poison is removed from the fresh liquid hydrocarbon, the degassed liquid hydrocarbon, or the stripper column tail in a purification bed.

Still another embodiment includes adjusting a stripper column pressure, a flow rate of the first portion of the recycle gas, a flow rate of the stripper vent gas, or combination thereof to increase the production of the stripper column tail or increase the removal of a volatile catalyst poison.

In yet another embodiment, a stripper column pressure, a flow rate of the first portion of the recycle gas, a flow rate of the stripper vent gas, or combination thereof is controlled in response to a level of volatile catalyst poison measured in a gaseous process stream.

In one embodiment, the recycle gas comprises a medium-pressure recycle gas formed by the steps of: a) compressing the process vent to form a medium-pressure recycle fluid; b) cooling and separating the medium-pressure recycle fluid to form a medium-pressure recycle liquid and the medium-pressure recycle gas.

Another embodiment also feeds the medium-pressure recycle liquid to the stripper column, or combines the medium-pressure recycle liquid with the stripper column tail to form the degassed hydrocarbon liquid.

In one embodiment, the recycle gas comprises a high-pressure recycle gas formed by the steps of: a) compressing the process vent to form a medium-pressure recycle fluid; b) separating the medium-pressure recycle fluid to form a medium-pressure recycle liquid and a medium-pressure recycle gas; and c) compressing the medium-pressure recycle gas to form the high-pressure recycle gas.

In another embodiment, the medium-pressure recycle liquid is fed to the stripper column, or the medium-pressure recycle liquid is combined with the stripper column tail to form the degassed hydrocarbon liquid. In yet another embodiment, a high-pressure recycle liquid is separated from at least a portion of the high-pressure recycle gas, and the high-pressure recycle liquid is fed to the stripper column, combined with the stripper column tail to form the degassed hydrocarbon liquid, or fed to the polymerization process.

In one embodiment, a purge bin vent and the stripper vent gas are combined to form the process vent.

In another embodiment, a targeted catalyst poison is removed from the fresh liquid hydrocarbon or the degassed liquid hydrocarbon in a purification bed.

In at least one embodiment, a non-condensable gas concentration in a reactor gas is reduced by: a) feeding a reactor vent from the polymerization process to the stripper column; and b) venting a portion of the stripper vent gas from the polymerization process, wherein the stripper vent gas comprises the non-condensable gas.

In another embodiment, the degassed liquid hydrocarbon is recycled to the stripper column.

In yet another embodiment, a portion of the degassed liquid hydrocarbon is stored.

In still another embodiment, the stored portion of the degassed liquid hydrocarbon is fed to the polymerization process.

One embodiment provides a method for removing volatile catalyst poisons from at least two liquid hydrocarbon feeds to a polymerization process by: a) feeding at least two independent liquid hydrocarbon streams to a stripper column; b) feeding a stripping gas to a lower portion of the stripper column; d) removing a stripper vent gas and a stripper column tail from the stripper column; and e) feeding the stripper column tail to the polymerization process.

In another embodiment, the at least two independent liquid hydrocarbon streams each comprise a liquid alkene, liquid alkane, or liquid cycloalkane. In yet another embodiment, the at least two independent liquid hydrocarbon streams comprise a $C_3$ alkene, $C_4$ alkene, $C_5$ alkene, $C_6$ alkene, C8 alkene, a $C_4$ alkane, $C_5$ alkane, $C_6$ alkane, C8 alkane, or combination thereof.

In yet another embodiment, a targeted catalyst poison is removed from at least one of the at least two independent liquid hydrocarbon streams, the stripper column tail, or the degassed liquid hydrocarbon.

In one embodiment, the at least two independent liquid hydrocarbon streams are combined to form a fresh liquid hydrocarbon before being fed into the stripper column.

In another embodiment, a targeted catalyst poison is removed from the fresh liquid hydrocarbon before being fed into the stripper column, or from the stripper column tail.

Another class of embodiments of the invention provides a system for removing a volatile catalyst poison from a liquid hydrocarbon feed to a polymerization process, the system comprising: a) a process vent originating from a polymerization process; b) a vent recovery system in fluid communication with the process vent, wherein the vent recovery system compresses the process vent to form a recycle gas; c) a stripper column, wherein the stripper column receives a first portion of the recycle gas and a fresh liquid hydrocarbon, and wherein a stripper column tail and a stripper vent gas exit the stripper column; and d) a liquid feed pump in fluid communication with the stripper column, wherein the liquid feed pump pressurizes a degassed liquid hydrocarbon comprising the stripper column tail.

In one embodiment, the system comprises a low-pressure separator in fluid communication with the process vent, wherein the low-pressure separator separates a process vent liquid from the process vent.

In another embodiment, the vent recovery system comprises: a) a vent recovery compressor, wherein the vent recovery compressor compresses the process vent; b) a vent recovery cooler in fluid communication with and downstream of the vent recovery compressor, wherein the vent recovery cooler receives a compressed recycle fluid from the vent recovery compressor; and c) a medium-pressure separator in fluid communication with and downstream of the vent recovery cooler, wherein the medium-pressure separator separates a recycle liquid from the compressed and cooled recycle fluid.

In another embodiment, a lower portion of the medium-pressure separator is in fluid communication with the stripper column, such that the recycle liquid flows to the stripper column.

In at least one embodiment, the stripper column comprises a chilled condenser in an upper portion of the stripper column, and the recycle liquid flows to the polymerization process.

In yet another embodiment, the vent recovery system is in fluid communication with the stripper column, such that the vent recovery system receives the stripper vent gas.

Another embodiment also comprises a purification bed, wherein the purification bed removes a targeted catalyst poison from the fresh liquid hydrocarbon, the stripper column tail, the degassed liquid hydrocarbon, the stripper vent gas, or a process vent liquid in a purification bed.

At least one embodiment comprises a reactor vent in fluid communication with the stripper column; and a light gas vent in fluid communication with the stripper column such that a portion of the stripper vent gas is removed from the polymerization process.

Another embodiment comprises a degassed liquid recycle, wherein the degassed liquid recycle is fed to the stripper column, and wherein the degassed liquid recycle comprises a portion of the degassed liquid hydrocarbon.

Yet another embodiment comprises a liquid storage vessel, wherein a portion of the degassed liquid hydrocarbon is stored.

Still another embodiment comprises a liquid surge vessel in fluid communication with a lower portion of the stripper column.

One class of embodiments of the invention provides a system for removing a volatile catalyst poison from a liquid hydrocarbon feed to a polymerization process, the system comprising: a) a polymer purge bin, wherein absorbed hydrocarbons are removed from a polymer product; b) a vent recovery system comprising a first stage compressor in fluid communication with the purge bin, wherein the first stage compressor receives a process vent exiting the purge bin, and wherein the vent recovery system produces a high-pressure recycle gas; c) a stripper column, wherein the stripper column receives a fresh liquid hydrocarbon and a first portion of the high-pressure recycle gas, and wherein a degassed liquid hydrocarbon and a stripper vent gas exit the stripper column; and d) a liquid feed pump in fluid communication with the stripper column, wherein the liquid feed pump pressurizes a degassed liquid hydrocarbon comprising the stripper column tail.

In one embodiment, the vent recovery system comprises a medium-pressure separator, a second stage compressor, and a high-pressure separator, and wherein a lower portion of the high-pressure separator is in fluid communication with the stripper column, such that a high-pressure recycle liquid flows from the high-pressure separator to the stripper column.

In another embodiment, a lower portion of the medium-pressure separator is in fluid communication with the liquid feed pump or the stripper column, such that when the lower portion of the medium-pressure separator is in fluid communication with the liquid feed pump, the pressure recycle liquid flows from the medium-pressure separator to the suction of the liquid feed pump, or such that when the lower portion of the medium-pressure separator is in fluid communication with the stripper column, a medium-pressure recycle liquid flows from the medium-pressure separator to the stripper column.

In at least one embodiment, the vent recovery system comprises a medium-pressure separator, a second stage compressor, a first high-pressure chiller, a first high-pressure separator, a second high-pressure chiller and a second high-pressure separator, a lower portion of the first high-pressure separator is in fluid communication with the stripper column, such that a first high-pressure recycle liquid flows from the high-pressure separator to the stripper column, and a lower portion of the second high-pressure separator is in fluid communication with the polymerization process, such that a second high-pressure recycle liquid flows from the second high-pressure separator to the polymerization process.

Another embodiment includes a purification bed, wherein the purification bed removes a targeted catalyst poison from the fresh liquid hydrocarbon or the degassed liquid hydrocarbon.

DETAILED DESCRIPTION

Before the present compounds, components, compositions, and/or methods are disclosed and described, it is to be understood that unless otherwise indicated this invention is not limited to specific devices, compounds, components, compositions, reactors, reactants, reaction conditions, feeds, hardware, catalyst structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Generally, embodiments disclosed herein relate to a method and system for removing volatiles from liquid hydrocarbons being fed to a polyolefin production system. More specifically, embodiments relate to a method and system for integrating the removal of volatiles from a liquid hydrocarbon feed to the polyolefin production system and the recovery of hydrocarbons from a polyolefin production process vent stream. The integrated method and system for removing volatile catalyst poisons may also provide embodiments that remove non-condensable gases from the polymerization system while saving the valuable monomer or comonomer contained in the reactor gas.

Figure 1:
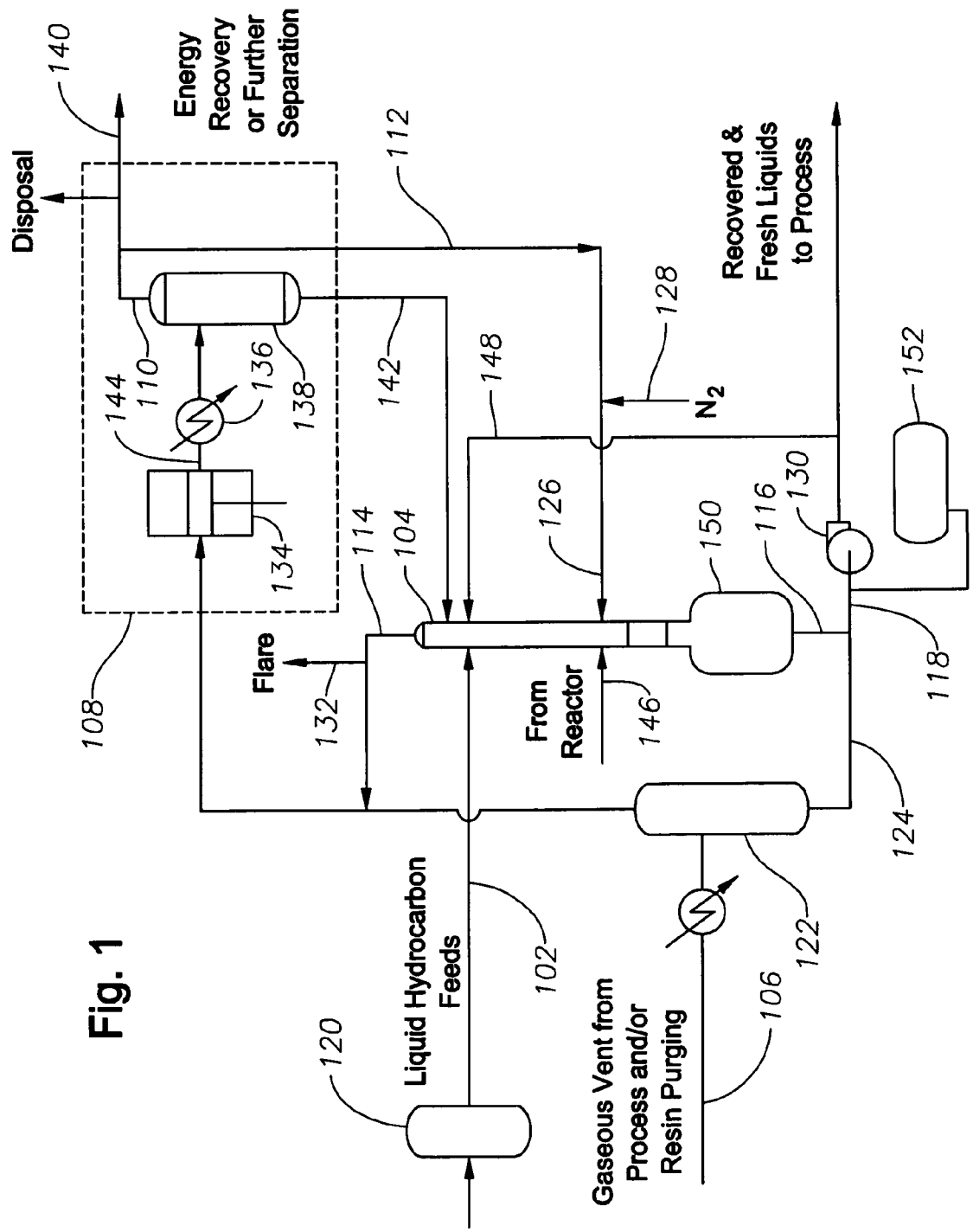
FIG. 1 is a schematic drawing of one class of embodiments of the invention wherein a liquid hydrocarbon feed stream is integrated with a vent gas recovery system.

Referring initially to FIG. 1, one class of embodiments provides a method for removing volatile poisons from a liquid hydrocarbon feed to a polymerization process, the method comprising the steps of: a) feeding a fresh liquid hydrocarbon (102) to a stripper column (104); b) providing a process vent (106) from a polymerization process; c) recycling the process vent in a vent recovery system (108) to form a recycle gas (110); d) feeding a first portion of the recycle gas (112) to the stripper column; e) removing a stripper vent gas (114) and a stripper column tail (116) from the stripper column; and f) feeding a degassed liquid hydrocarbon (118) comprising the stripper column tail (116) to the polymerization process.

A "volatile catalyst poison", as used herein, refers to a compound that is a poison to the polymerization catalyst or cause reaction instabilities when introduced into the polymerization reactor, and boils at higher pressures, and or lower temperatures than the liquid hydrocarbon feed in which it is contained. The volatile catalyst poison may be a compound such as oxygen, carbon dioxide, and carbon monoxide. Typically, the removal of volatile catalyst poisons may improve catalyst productivity and stability of the polymerization reaction process. Although this description refers to "a volatile catalyst poison", one skilled in the art will recognize that multiple catalyst poisons may be removed by the processes and systems described herein.

As used herein, a "targeted catalyst poison" may be any catalyst poison contained in a liquid hydrocarbon feed that is desired to remove before feeding the liquid hydrocarbon to the polymerization process. The "targeted catalyst poison" may or may not be a volatile catalyst poison as defined above.

In some of the embodiments herein, the targeted catalyst poison may comprise polar compounds, for example water, In any of the embodiments herein the fresh liquid hydrocarbon (102) feed stream may comprise a liquid alkene, liquid alkane, or liquid cycloalkane. The fresh liquid hydrocarbon (102) may be at ambient temperature, for example, about −10 to about 50° C. Raw liquid hydrocarbon feeds containing volatile catalyst poisons may be pumped from offsite or onsite storage to the claimed system. These raw materials may be purified and then pressured to the stripper column (104). In any of the embodiments herein, the fresh liquid hydrocarbon (102) may comprise a $C_3$ alkene, $C_4$ alkene, $C_5$ alkene, $C_6$ alkene, $C_8$ alkene, a $C_4$ alkane, $C_5$ alkane, $C_6$ alkane, $C_8$ alkane, or combination thereof. In any of the embodiments herein, the fresh liquid hydrocarbon (102) may be initially purified in a purification bed (120) to remove a targeted catalyst poison before being fed to the stripper column. In other embodiments, the stripper column tail (116) or the degassed liquid hydrocarbon (118) may be purified in a purification bed downstream of the stripper column to remove a targeted catalyst poison. Purification may include removing targeted poisons by processing in an absorbent bed, for example, a sieve bed, or treatment by other purification processes known in the art. In some of the embodiments herein, the fresh liquid hydrocarbon (102) comprises less than about 1, 10, or 100 ppm water by volume (ppmv). In any of the embodiments herein, the degassed liquid hydrocarbon may comprise less than about 0.01, 0.1, or 1 ppmv water.

Still referring to FIG. 1, in any of the embodiments herein, the stripper column (104) may be a packed bed or trayed column. The stripper column (104) may be operated at a temperature and pressure below the boiling point of the fresh liquid hydrocarbon (102) being fed to the column. The stripper column (104) contacts a stripping gas (126), for example a recycled vent gas, with the liquid hydrocarbon in the stripper column (104) by feeding the fresh liquid hydrocarbon (102) to an upper portion of the stripper column (104) while feeding the stripping gas (126) to a lower portion of the stripper column (104). A vent is then taken from the upper portion of the stripper column (104) forming a stripper vent gas (114) and causing the stripping gas to flow upwards through the stripper column (104) while the liquid hydrocarbon travels down through the stripper column (104). Volatile catalyst poisons are transferred from the liquid hydrocarbon into the stripping gas, and then carried out in the stripper vent gas (114). Thus, in any of the embodiments herein, the stripper vent gas (114) may comprise stripping gas, a hydrocarbon, and a volatile catalyst poison. The liquid hydrocarbon is then removed from a lower portion of the stripper column (104) as a stripper column tail (116).

In any of the embodiments herein, the stripper column may be mounted on, or combined with a low-pressure separator (122) that receives the process vent (106) and removes a process vent liquid (124) from the process vent (106) stream. In some of the embodiments herein, the stripper column (104) may further comprise a reboiler, and condenser. The stripper column tail (116) may be fed to the polymerization process as at least a portion of the degassed liquid hydrocarbon (118).

In any embodiments herein, the stripper column may further comprise a chilled condenser (not shown) in an upper portion of the stripper column. In some embodiments, for example where there is a condenser, the recycle liquid is fed directly to the polymerization process.

The stripping gas (126) that is fed to the lower portion of the stripper column (104) may be relatively high in nitrogen content. The stripping gas (126) may comprise a first portion of a recycle gas (110), which may comprise greater than 20, 50, or 90 mole % nitrogen. Furthermore, the first portion of a recycle gas (110) should be fairly low in volatile catalyst poisons by nature (as it originates from the polymerization process). For example, the first portion of a recycle gas (110) may comprise less than about 0, 0.5, or 5 ppmv oxygen, less than about 0, 0.1, 1, or 10 ppmv carbon monoxide, less than about 0, 0.1, or 1.0 ppmv carbon dioxide, or a combination thereof. In any of the embodiments herein, the first portion of the recycle gas (112) may be comprised of a process vent (106), which may comprise a purge bin vent gas that has been compressed. In some embodiments, the stripping gas (126) may be supplemented by a purified nitrogen gas (128), thus the stripping gas may comprise the first portion of the recycle gas (112) and a purified nitrogen gas (128).

In some of the embodiments herein, a process vent liquid (124) is separated from the process vent (106) before the process vent is sent to the vent recovery system (108) to produce the recycle gas (110). In some of the embodiments herein the process vent liquid (124) is then combined with the stripper column tail (116) exiting the bottom of the stripper column to form the degassed liquid hydrocarbon (118), which is then fed to the polymerization process.

In any of the embodiments herein, the degassed liquid hydrocarbon (118) may be pressurized by a liquid feed pump (130) and fed to the polymerization process. The degassed liquid hydrocarbon (118) may comprise less than about 0.01, 0.1, or 1.0 ppmv (parts per million by volume) oxygen, less than about 0.01, 0.1, or 1.0 ppmv carbon monoxide, less than about 0.05, 0.5, or 5.0 ppmv carbon dioxide, or a combination thereof.

In any of the embodiments herein, the method may further comprise the step of feeding the stripper vent gas (114) to a vent recovery system (108), a flare (not shown), or a combination thereof. The stripper vent gas (114) may be fed to the suction of a first stage of the vent recovery system (108) with the process vent (106) or may be fed to an intermediate stage of the vent recovery system (108). The stripper vent gas (114) is enriched with the volatile catalyst poison. In some embodiments, the mixing of the process vent (106) and the stripper vent gas (114) may not be critical to the function of the invention, but may be important to the economic design of the system. The configuration of FIG. 1 minimizes venting of valuable raw materials during normal operation. The rate of feeding stripping gas (the first portion of the recycle gas (112) or purified nitrogen gas (128) fed to the lower portion of the stripper column) and a stripper column pressure may be adjusted to reach the desired volatile catalyst poison concentration in the degassed liquid hydrocarbon (118) fed to the polymerization system.

The stripper vent gas (114) may comprise from about 1 to 10, about 10 to 100, or about 100 to 1,000 ppmv volatile catalyst poisons. The stripper vent gas (114) may also comprise other light gases, for example hydrogen, ethylene, or ethane. In some of the embodiments herein, at least a portion of the stripper vent gas (114) may be routed directly to a flare, other disposal system, or an alternate recovery system as a light gas vent (132). In other embodiments, at least a portion of the stripper vent gas (114) is fed into a second portion of the process vent and the combined process vent and stripper vent gas is routed to a vent recovery system (108).

The vent recovery system (108) may be any vent recovery system suitable for the polymerization process. Vent recovery systems, such as the one described in U.S. Pat. No. 5,391,656, may comprise various stages of compression, cooling, and liquid recovery. In one embodiment shown in FIG. 1, the vent recovery system (108) comprises a vent recovery compressor (134) wherein a process vent (106) is compressed to form a compressed recycle fluid (144). The compressed recycle fluid is then cooled in a vent recovery cooler (136). The cooled recycle fluid then flows to a medium-pressure separator (138) wherein the cooled recycle fluid is separated into a recycle gas (110) and a recycle liquid (142).

In some of the embodiments herein, a first portion of the recycle gas (112) may be fed to a lower portion of the stripper column, the polymerization process, a product conveying system, the flare, or a combination thereof. The first portion of the recycle gas (112) may be available at a pressure higher than the stripper column (104) and fairly low in volatile catalyst poisons. The process vent (106) is preferably very low in volatile catalyst poison concentration. When the process vent (106) comes from a purge bin, the volatile catalyst poison concentration is typically low by nature, and serves to provide a good source of stripping gas.

In some of the embodiments herein, the recycle liquid (142) may be fed to the stripper column (104), or may be combined with the stripper column tail (116) to form the degassed liquid hydrocarbon (118). Feeding this stream to the stripper column (104) is optional depending on the amount of volatile catalyst poison concentrating that occurs in the vent recovery system (108). The disposition of this stream is a balance of stripper column cost and volatile catalyst poison removal efficiency based on the quality of the process vent (106) and the amount of volatile catalyst poison in the fresh liquid hydrocarbon (102). Varying feed quality and operating conditions of the vent recovery system (108) may greatly influence the final disposition of the recycle liquid (142).

The second portion of recycle gas (140), which is non-condensed gas rich in nitrogen and light hydrocarbons, may be sent for further purification, recycled to the process, or may be used as a conveying gas or other means to recovery contained energy. A portion of the recycle gas (110) may also be vented from the system to a flare or other disposal system. This vent may be taken to prevent the build-up of any volatile inerts that may be removed from the fresh liquid hydrocarbon (102).

In other embodiments, a purified nitrogen gas (128) may be fed to the stripper column in place of, or in combination with the first portion of recycle gas (110) (in combination with includes feeding the purified nitrogen into the first portion of the recycle gas). The purified nitrogen gas (128) may be fed to a lower portion of the stripper column when there is insufficient recycle gas (110) to supply the stripper column with stripper gas, or when the process vent (106) and thus the recycle gas (110) may be contaminated with poisons, such as during startup.

In any of the embodiments, the build-up of a light gas in the polymerization process, the process vent (106), the recycle gas (110), or the recycle liquid (142) may be controlled by venting a portion of the stripper vent gas (114), the process vent (106), or recycle gas (110) to a flare or a recovery system.

Any of the embodiments herein may also comprise the step of adjusting a stripper column pressure, a rate of feeding the first portion of the recycle gas (112) to the stripper column (104), a flow rate of the stripper vent gas (114), or combination thereof to increase the production of the stripper column tail (116) or increase or decrease the removal of a volatile catalyst poison.

Other embodiments of the invention may provide the ability to remove a non-condensable gas from the polymerization system. That is, because similar equipment is required, the comonomer stripping method may be integrated with a method of removing non-condensable gases from the reactor gas while recovering the monomer and/or comonomer from the reactor gas. Using a reactor vent (146) as the gas feed to the stripper column (104) can be useful when, such as during a transition, it is desired to reduce the concentration of a non-condensable such as hydrogen or nitrogen in the reactor gas. In this case the stripper column (104) is operating more as a scrubber column to strip monomer or comonomer, for example, $C_4$ and higher components, as the reactor gas is vented from the polymerization process. The polymerization system may be vented during a running transition, wherein there is significant fresh liquid feeds for scrubbing monomer out, or a shutdown transition, wherein a degassed liquid recycle (148) is fed back to the stripper column (104), for example, to an upper portion of the column. Thus, in at least one embodiment, a non-condensable gas concentration in a reactor gas is reduced by: a) feeding a reactor vent (146) from the polymerization process to the stripper column (104); and b) venting a portion of the stripper vent gas (114) from the polymerization process, wherein the stripper vent gas comprises the non-condensable gas. In some cases, for example when the flow of fresh liquid hydrocarbon (102) is very low, the degassed liquid hydrocarbon (118) may be fed back to the stripper column (104) as a degassed liquid recycle (148).

At least one embodiment of the method comprises the step of storing a portion of the degassed liquid hydrocarbon (118). In general it is expected that the volume of liquid between the stripper column (104) and the reactor may be minimized so that the lag time in between changing the feed rate of the fresh liquid hydrocarbon (102) and the change reaching the reactor is minimized. However, is some cases, for example when transitioning, it may be desirable to store the degassed liquid hydrocarbon (118) rather than feeding it to the reaction system. For example, such a transition may begin by shutting off or reducing the fresh liquid hydrocarbon (102) feed to the stripper column (104). With the vent recovery system (108) continuing to operate, there may be recovered liquids rich in the first co-monomer that could be diverted to a liquid storage vessel (152) rather than being sent to the reactor or being removed as a waste liquid. When the concentration of the first co-monomer is sufficiently reduced the liquid storage vessel (152) would be isolated and the fresh liquid hydrocarbon (102) feed of the second co-monomer would begin. In this way less ter-polymer will be produced in the transition. The degassed liquid hydrocarbon (118) that was stored, which comprises primarily the first co-monomer, can either be gradually bled back into the liquid feed (at a level where product quality is not effected) or it can be kept until the reactor returns to the first co-monomer. Thus, at least one embodiment of the invention may feed the stored portion of the degassed liquid hydrocarbon to the polymerization process. In the later case it may be desirable to have more than one liquid storage vessel (152), for example, one for each co-monomer used in the product cycle.

Still referring to FIG. 1, one class of embodiments provides a system for removing a volatile catalyst poison from a liquid hydrocarbon feed to a polymerization process, the system comprising: a) a process vent (106) originating from a polymerization process; b) a vent recovery system (108) in fluid communication with the process vent, wherein the vent recovery system compresses the process vent to form a recycle gas (110); c) a stripper column (104), wherein the stripper column receives a first portion of the recycle gas (112) and a fresh liquid hydrocarbon (102), and wherein a stripper column tail (116) and a stripper vent gas (114) exit the stripper column; and d) a liquid feed pump (130) in fluid communication with the stripper column (104), for example, to a lower portion of the stripper column, wherein the liquid feed pump pressurizes a degassed liquid hydrocarbon (118)

comprising the stripper column tail (116). In some embodiments, the pressurized degassed liquid hydrocarbon is fed to the polymerization process.

In any of the embodiments herein, the system may further comprises a low-pressure separator (122) in fluid communication with the process vent (106), wherein the low-pressure separator separates a process vent liquid (124) from the process vent. In one embodiment, the low-pressure separator (122) may be separate from the base of the stripper column (104) and the surge volume of the stripper column minimized to dampen composition change lags. Removal of entrained liquid from the combined gaseous process vent stream and stripper overhead gas stream occurs downstream of the stripper as a separate operation. This configuration, while increasing the number of process steps, may have the effect of reducing capital expense and simplifying stripper bottoms composition control strategies.

In one embodiment of the invention, a liquid surge vessel (150) at the base of the column also functions as a liquid/gas separator for the process vent (106). In this case, the process vent liquid mixes with the stripper column tail (116) and a shared feed pump delivers the mixture to the polymerization process. A liquid level provides a seal so that the stripping gas fed to the stripper column (104) flows up through the column. The non-condensed portion of the process vent (106) may be combined with the stripper vent (110) from the top of the stripper column (104) and the combined stream is recycled in the vent recovery system (108).

In some of the embodiments herein, the vent recovery system may comprise: a) a vent recovery compressor (134), wherein the vent recovery compressor compresses the process vent (106); b) a vent recovery cooler (136) in fluid communication with and downstream of the vent recovery compressor (134), wherein the vent recovery cooler receives a compressed recycle fluid (144) from the vent recovery compressor; and c) a medium-pressure separator (138) in fluid communication with and downstream of the vent recovery cooler (136), wherein the medium-pressure separator separates a recycle liquid (142) from the compressed and cooled recycle fluid. In one embodiment, a lower portion of the medium-pressure separator (138) is in fluid communication with the stripper column (104), thus allowing the recycle liquid to flow to the stripper column. In another embodiment (not shown in FIG. 1), the lower portion of the medium-pressure separator is in fluid communication with the liquid feed pump by combining the recycle liquid with the stripper column tail.

In any of the embodiments herein, the system my comprise a purification bed (120), wherein the purification bed removes a targeted catalyst poison from the fresh liquid hydrocarbon (102), the stripper column tail (116), degassed liquid hydrocarbon (118), the process vent liquid (124), or a combination thereof.

In at least one embodiment, the system may comprise a reactor vent (146) in fluid communication with the stripper column (104), and a light gas vent (132) in fluid communication with the stripper column (104) such that a portion of the stripper vent gas (114) is removed from the polymerization process. The reactor vent (146) may originate directly from the reactor vessel, or may be a vent from another point in the polymerization system. The reactor vent (146) may comprise non-condensable components, for example, hydrogen, ethane, propane, nitrogen. The reactor vent may comprise monomers, or monomers and commoners, for example $C_2$ and higher monomers and/or comonomers, $C_3$ and higher monomers and/or comonomers, or $C_3$ and higher monomers and/or comonomers. In some embodiments, the reactor vent (146) comprises substantially the same gas components and concentrations as in the reactor vessel. The reactor vent may be fed to a lower portion of the stripper column (104) to allow the gas to rise up through the column and contact the falling liquid to strip out the contained condensable monomers and/or comonomers, for example, C3 and higher monomers and/or comonomers, or C4 and higher monomers and/or comonomers.

The light gas vent (132) in fluid communication with the stripper column (104) allows a portion of the stripper vent gas (114) to be routed to a flare, or other recovery system external to the polymerization system. In at least one embodiment, the stripper vent gas (114) comes from an upper portion of the stripper column (104) and may comprise a significantly higher concentration of non-condensable gases than the reactor vent (146), making it a desirable stream to remove when it is desirable to reduce the amount of non-condensables in the polymerization system. Because a significant amount of the monomers and/or comonomers are stripped out in the stripper column (104), venting the stripper vent gas (114) also prevents excessive losses of comonomer and/or comonomer when venting non-condesables from the polymerization system.

In some cases, the feed rate of the fresh liquid hydrocarbon (102) may be reduced to flow rates that are below the levels that are required for proper operation of the stripper column (104). Thus, in at least one embodiment, the system comprises a degassed liquid recycle (148), wherein the degassed liquid recycle is fed to the stripper column (104), and wherein the degassed liquid recycle comprises a portion of the degassed liquid hydrocarbon (116). The degassed liquid recycle (148) may be taken from the discharge of the liquid feed pump (130), or may fed from a separate recycle pump. If the stripper column (104) comprises a chiller (not shown) in the upper portion of the stripper column, the degassed liquid recycle (148) may be fed above the chiller.

In at least one embodiment, the system comprises a liquid storage vessel (152), wherein a portion of the degassed liquid hydrocarbon (118) is stored. The liquid storage vessel (152) may be a high pressure tank fed by a branch after the liquid feed pump (130) or a medium pressure tank in a branch upstream of the liquid feed pump (130).

In other embodiments, the system may comprise a liquid surge vessel (150) in fluid communication, for example, directly attached to, a lower portion of the stripper column (104).

Figure 2:
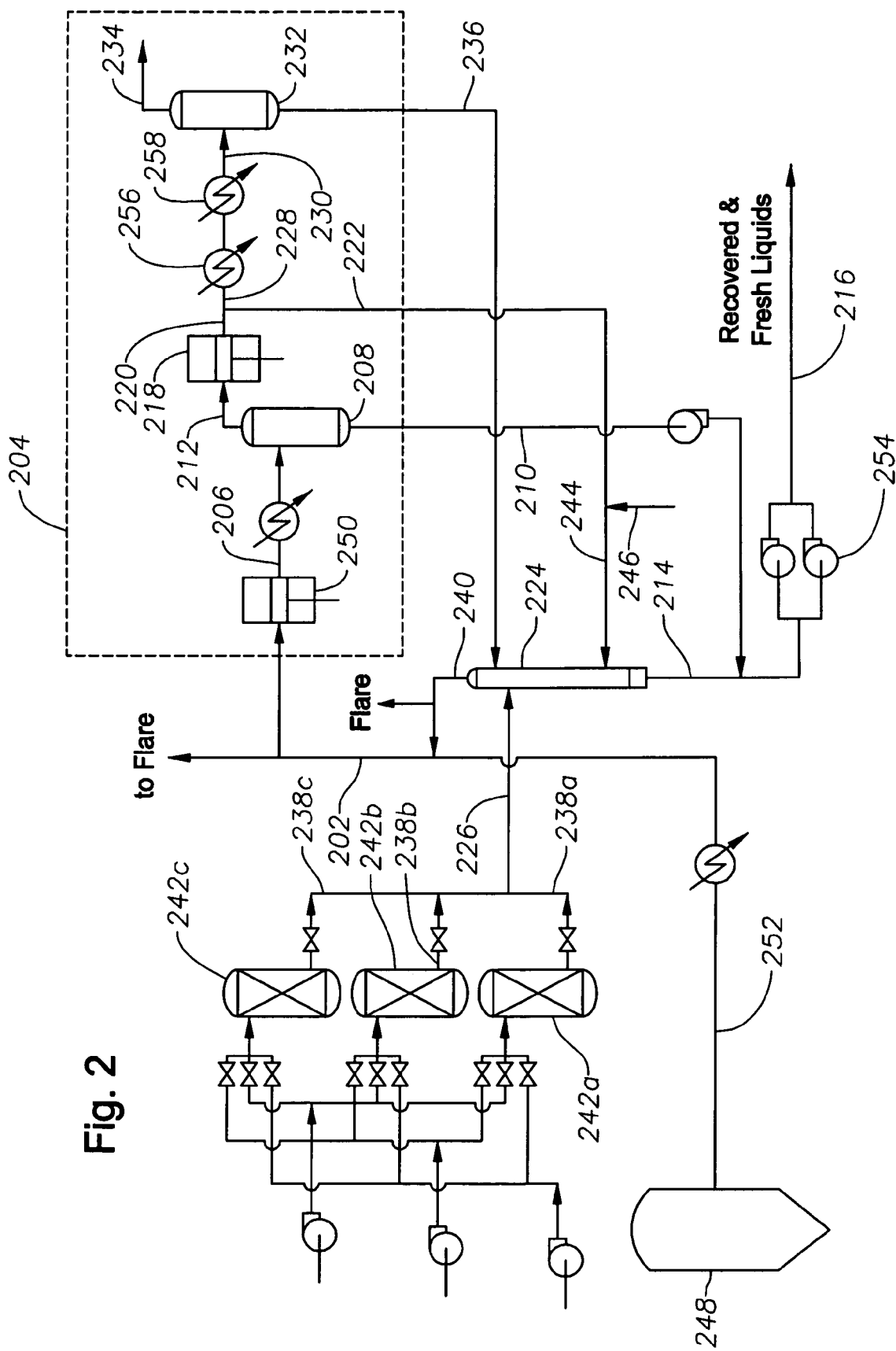
FIG. 2 is a schematic drawing of one class of embodiments of the invention wherein multiple liquid hydrocarbon feed streams are degassed in a single liquid degassing system.

Now referring to FIG. 2, some of the embodiments herein may compress the process vent (202) in a vent recovery system (204) comprising multiple compression, cooling, and liquid separation stages. In some of the embodiments herein, a first stage compressor compresses the process vent (202) to form a medium-pressure recycle fluid (206). The medium-pressure recycle fluid (206) may be cooled and then separated in a medium-pressure separator (208) to form a medium-pressure recycle liquid (210) and a medium-pressure recycle gas (212). In some of the embodiments herein the medium-pressure recycle liquid (210) may be combined with the stripper column tail (214) to form a degassed liquid hydrocarbon (216).

Still referring to FIG. 2, in some of the embodiments herein, the medium-pressure recycle gas (212) may be compressed in a second stage compressor (218) to form a high-pressure recycle gas (220). A first portion of the high-pressure recycle gas (222) may then be fed to a lower portion of the stripper column (224) to degas the fresh liquid hydrocarbon (226). In one embodiment, the takeoff for the first portion of the high-pressure recycle gas (222) is placed before rather than after the cooling and condensation step to allow the stripping operation to utilize a portion of the compressor's heat of compression, thus increasing the capacity of the stripper for a given stripper size (assuming mass transfer is the limiting factor for volatile catalyst poison removal). Alternatively, the stripper column (224) size may be reduced for a given stripper efficiency.

In other embodiments herein, a second portion of the high-pressure recycle gas (228) may be chilled, by cooling water and/or refrigeration, to form a cool high-pressure recycle fluid (230). The cool high-pressure recycle fluid (230) may then be routed to a high-pressure separator (232) wherein it is separated into a recovered vent gas (234) and a high-pressure recycle liquid (236). The recovered vent gas (234) may then be routed to a flare, or to the polymerization process and used as reactor make-up gas or product conveying assist gas. The high-pressure recycle liquid (236) may be routed to the stripper column (224) for degassing, and combine with the fresh liquid hydrocarbon (226) to form the stripper column tail (214). In at least one embodiment, the high-pressure recycle liquid is fed to the stripper column, combined with the high-pressure recycle liquid with the stripper column tail to form the degassed hydrocarbon liquid, or fed to the polymerization process.

Still referring to FIG. 2, one class of embodiments provides a method for removing a volatile catalyst poison from a liquid hydrocarbon feed to a polymerization process, the method comprising the steps of: a) feeding at least two independent liquid hydrocarbon streams (238a,b,c) to a stripper column (224); b) feeding a stripping gas (244) to a lower portion of the stripper column; d) removing a stripper vent gas (240) and a stripper column tail (214) from the stripper column; and e) feeding the stripper column tail (214) to the polymerization process. Feeding multiple liquid hydrocarbon streams through one stripping system has the advantage of saving investment and operating costs, and may reduce the number of vent streams routed to the flare, thus the total amount of inerts, such as nitrogen, that are routed to the flare.

The at least two independent liquid hydrocarbon streams (238,a,b,c) may be any fresh liquid hydrocarbon feed stream as described above. In any of the embodiments herein, the at least two independent liquid hydrocarbon streams (238,a,b,c) may be initially purified in a purification bed (242,a,b,c) to remove a targeted catalyst poison before being fed to the stripper column.

In other embodiments, the stripper column tail (214) or the degassed liquid hydrocarbon (216) may be purified in a purification bed downstream of the stripper column to remove a targeted catalyst poison. Purification may include removing targeted poisons by processing in an absorbent bed, for example, a sieve bed, or treatment by other purification processes known in the art.

In some embodiments, the stripping gas (244) fed to the stripper column (224) may be a purified nitrogen (246), a first portion of a high-pressure recycle gas (222), or a combination thereof In some of the embodiments herein, the at least two independent liquid hydrocarbon streams (238,a,b,c) may be combined to form a fresh liquid hydrocarbon (226) before being fed into the stripper column (224).

In one embodiment, the method may be optimized to take advantage of the concentrating of the volatile catalyst poison in a gaseous stream, for example the stripper vent gas (240) or recovered vent gas (234). Current methods for the detection and accurate measurement of volatile catalyst poisons in liquid streams are unreliable and not very useful for the real-time control using degassing systems of the prior art. As a result, attempts to optimize the operation in real-time using online analysis are futile and operators must continuously vent a small portion of the raw material to the flare to insure the feed quality. More reliable online analysis methods exist for gaseous stream applications. The current invention concentrates the volatile catalyst poisons in the stripper vent gas (240) or recovered vent gas (234). These streams can be more accurately monitored for volatile catalyst poisons. Having the ability to more reliably detect and accurately measure the amount of volatile catalyst poisons and the ability to adjust the operation of the stripper column (224) provides greater opportunity for process optimization. Thus one embodiment of the invention provides for controlling a stripper column pressure, a flow rate of the first portion of the high-pressure recycle gas (222), a flow rate of the stripper vent gas (240), or combination thereof in response to a level of volatile catalyst poison measured in a gaseous process stream. The gaseous process stream may comprise a reactor gas, the stripper vent gas (240), the process vent (202), the medium pressure recycle gas (212), the high-pressure recycle gas (220), or any other suitable process stream which reflects the content of volatile catalyst poison in the polymerization system. Measurement of the volatile catalyst poison may be by any gas analyzer suitable for the particular volatile catalyst poison being monitored.

In at least one embodiment, the stripper vent gas (240) may be fed to a vent recovery system (204), a flare, or a combination thereof. In still other embodiments, the stripper vent gas (240) may be fed to the suction of a first stage of the vent recovery system (204) with the process vent (252) or may be fed to the suction of a second stage compressor (218) in the vent recovery system (204).

Another class of embodiments provides a system for removing a volatile catalyst poison from a liquid hydrocarbon feed to a polymerization process, the system comprising: a) a polymer purge bin (248), wherein absorbed hydrocarbons are removed from a polymer product; b) a vent recovery system (204) comprising a first stage compressor (250) in fluid communication with the purge bin, wherein the first stage compressor receives a process vent (202) exiting the purge bin, and wherein the vent recovery system produces a high-pressure recycle gas (220); c) a stripper column (224), wherein the stripper column receives a fresh liquid hydrocarbon (226) and a first portion of the high-pressure recycle gas (222), wherein a degassed liquid hydrocarbon (216) exits the stripper column, and wherein a stripper vent gas (240) exits the stripper column; and d) a liquid feed pump (254) in fluid communication with the stripper column, wherein the liquid feed pump pressurizes a degassed liquid hydrocarbon (216) comprising the stripper column tail (116). In some embodiments, the fresh liquid hydrocarbon (226) may be received into an upper portion of the stripper column, the first portion of the high-pressure recycle gas (222) may be received into a lower portion of the stripper column, the stripper vent gas (240) may exit an upper portion of the stripper column, and a stripper column tail (214) may exit a lower portion of the stripper column. In some embodiments, the stripper column tail (214) may be the degassed liquid hydrocarbon (216).

The polymer purge bin (248) may be any design known to one in the art suitable for the particular polymerization process. See, for example, U.S. Pat. Nos. 4,372,758, which describes purging freshly reacted polymers in a cylindrical purging vessel with a conical lower section.

The first stage compressor (250) may be any type suitable for compressing the purge bin vent. In some embodiments, the first stage compressor (250) may be a reciprocating or screw-type compressor. The process vent exiting the purge bin (purge bin vent (252)) may be at a low pressure, for example from about 0 to about 100 kPa gauge (0 to 14.5 psig) and may be compressed by the first stage compressor to a medium pressure, for example to about 200 to 896 kPa gauge (29 to 130 psig).

The liquid feed pump (254) may be of any type suitable for supplying the degassed liquid hydrocarbon (216) to the polymerization process. Suitable pumps may include diaphragm pumps, multi-stage centrifugal pumps, or others.

In some embodiments herein, the vent recovery system may also comprise a medium-pressure separator (208), a second stage compressor (218), and a high-pressure separator (232), wherein a lower portion of the high-pressure separator is in fluid communication with the stripper column (224), for example with the upper portion of the stripper column, such that a high-pressure recycle liquid (236) flows from the high-pressure separator to the stripper column. The second stage compressor (218) may be any type suitable for compressing the medium-pressure recycle gas (212), for example, a reciprocating or screw-type compressor. The medium-pressure recycle gas (212) may be compressed to a relatively high pressure, for example to about 800 to 2000 kPa gauge (116 to 290 psig).

In some embodiments herein, a lower portion of the medium-pressure separator (208) may be in fluid communication with the liquid feed pump (254). This allows a medium-pressure recycle liquid (210) to be combined with the stripper column tail (214) and routed to the polymerization system as part of the degassed liquid hydrocarbon (216). Optionally, the medium-pressure recycle liquid (210) may be routed to the stripper column (224), for example to an upper portion of the stripper column, where it combines with the liquid hydrocarbons in the column and exits as part of the stripper column tail (214).

In at least one embodiment, the vent recovery system (204) comprises a medium-pressure separator (208), a second stage compressor (218), a first high-pressure chiller (256), a second high-pressure chiller (258), an auxiliary high-pressure separator (not shown) located between the first high-pressure chiller (256) and the second high-pressure chiller (258), and a high-pressure separator (232), wherein a lower portion of the auxiliary high-pressure separator is in fluid communication with the stripper column (224), such that a first high-pressure recycle liquid flows from the auxiliary high-pressure separator to the stripper column (224), and a lower portion of the high-pressure separator (232) is in fluid communication with the polymerization process, such that a second high-pressure recycle liquid (not shown) flows from the high-pressure separator (232) to the polymerization process.

Polymerization Processes

Embodiments described herein may be suitable for use in any polymerization process. In a class of embodiments, the current invention may be particularly suited for use in polyolefin polymerization processes using a monomer, and/or comonomer, that is received and processed as a liquid. Processes may include gas phase fluid bed polymerization of one or more olefin, at least one of which is ethylene, in the presence of a catalyst (see, for example, U.S. Pat. Nos. 4,543,399, 4,588,790, 5,028,670, 5,317,036, 5,352,749, 5,405,922, 5,436,304, 5,453,471, 5,462,999, 5,616,661 and 5,668,228). Other polymerization processes, particularly gas phase fluid bed processes, may comprise a cycle fluid that comprises a gas phase and a liquid phase.

The process of this invention may be directed toward a gas phase polymerization process of one or more olefin monomers having from 2 to 30 carbon atoms, preferably 2 to 12 carbon atoms, or 2 to 8 carbon atoms. The invention is well suited to the polymerization of two or more olefin monomers of ethylene, propylene, butene-1, pentene-1,4-methyl-pentene-1, hexene-1, octene-1 and decene-1.

Useful combinations include ethylene with one more of butene, hexene, octene, or mixtures thereof.

Other monomers useful in the process may include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In one class of embodiments, a copolymer of ethylene may be produced, where with ethylene, a comonomer having at least one alpha-olefin having from 3 to 15 carbon atoms, from 4 to 12 carbon atoms, or from 4 to 8 carbon atoms, may be polymerized in a gas phase process.

The reactor pressure in a gas phase process may vary from about 690 kPa gauge (100 psig) to about 4138 kPa gauge (600 psig), from about 1379 kPa gauge (200 psig) to about 2759 kPa gauge (400 psig), or from about 1724 kPa gauge (250 psig) to about 2414 kPa gauge (350 psig).

The reactor temperature in a gas phase process during the contacting step may vary from about 30° C. to about 120° C., about 60° C. to about 115° C., about 70° C. to 110° C., or about 70° C. to about 95° C.

Other gas phase processes contemplated by the invention may include series or multistage polymerization processes. Also gas phase processes contemplated by the invention may include those described in U.S. Pat. Nos. 5,627,242, 5,665,818 and 5,677,375; and EP-A-0 794 200 EP-B1-0 649 992, EP-A-0 802 202 and EP-B-634 421.

The invention may also be directed to a polymerization process, for example, a gas phase polymerization process, for polymerizing propylene alone or with one or more other monomers including ethylene, and/or other olefins having from 4 to 12 carbon atoms. Propylene based polymers that may be produced in the process include atactic polypropylene, isotactic polypropylene, and syndiotactic polypropylene. Other propylene polymers include propylene random, block or impact copolymers.

In several embodiments, the invention provides a lower cost (capital and operating expense) option to conventional liquid feed degassing by distillation. Because the stripper column is integrated with the hydrocarbon recovery operation, raw material losses typically associated with gas stripping operations are reduced. Additionally, there may be more opportunities to optimize the volatile catalyst poison removal operation. One optimization step involves having the ability to vary the volatile catalyst removal efficiency of the stripper column. The stripper column can be operated in either a hydrocarbon recovery or volatile catalyst poison removal mode by adjusting the stripper column pressure and stripping gas rate. Higher pressure and lower stripping gas rate favors greater hydrocarbon recovery. Lower pressure and higher stripping gas rate favors volatile catalyst poison removal.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

The following examples are derived from modeling techniques and although the work was actually achieved, the inventors do not present these examples in the past tense to comply with M.P.E.P. §608.01(p) if so required.

The results of process simulations for the invention presented below are based on a liquid hydrocarbon degassing system designed to supply liquid comonomer with sufficient capacity to operate a 300 KTA (kilo-ton annual capacity) gas-phase polyethylene process while producing linear low density polyethylene (LLDPE) on butene or hexene comonomer at full production rates. In these examples, it is assumed that the same liquid comonomer supply system is used to supply commoner when producing a high density polyethylene (HDPE) product, even though the system may be operated well below capacity. In these examples, the liquid feed degassing operations are integrated with the hydrocarbon recovery operations of the current invention as shown in FIG. 2.

Example 1

In the first simulation, the fresh liquid hydrocarbon (226) comprises primarily a single liquid hydrocarbon. The oxygen content in the degassed liquid hydrocarbon (216) is simulated for levels of 5, 20, and 100 ppm by volume oxygen in the fresh liquid hydrocarbon (226). The simulation is for three production cases. In case A, the gas phase reaction system is simulated to be producing a LLDPE product using butene as the comonomer. In case B, the simulation assumes a LLPDE product was produced using hexene as the comonomer. In case C, the simulation assumes a HDPE product was produced using butene as the comonomer. Table 1 shows the degree of oxygen (one of the most commonly found volatile catalyst poisons) reduction expected.

TABLE 1

| Case | Oxygen Content of Fresh Liquid Hydrocarbon (ppmv (parts per million by volume)) | Oxygen Content of Degassed liquid hydrocarbon (ppmv (parts per million by volume)) |
|---|---|---|
| A | 5 | 0.023 |
|   | 20 | 0.094 |
|   | 100 | 0.468 |
| B | 5 | 0.036 |
|   | 20 | 0.144 |
|   | 100 | 0.719 |
| C | 5 | 0.003 |
|   | 20 | 0.005 |
|   | 100 | 0.026 |

Selected stream data for Case B with 5 ppmv oxygen in the Dried Liquid Feeds is shown in Table 2a and 2b.

TABLE 2a

| | Stream No. (See FIG. 2) | | | | |
|---|---|---|---|---|---|
| | 238(a) | 238(b) | 252 | 214 | 240 |
| Temperature C. | 40.0 | 25.0 | 87.0 | 30.7 | −7.5 |
| Absolute Pressure kPa (psi) | 1030 (150.0) | 1030 (150.0) | 122 (17.7) | 517 (75.0) | 517 (75.0) |
| Flow kgmol/hr (lbmol/hr) | 42.3 (93.3) | 0.32 (0.7) | 130.7 (288.1) | 58.1 (128.1) | 2.0 (4.4) |
| Mass Flow kg/sec | 0.989 | 0.007 | 1.266 | 1.340 | 0.016 |
| Mass Flow lb/hr | 7,852 | 52 | 10,050 | 10,634 | 127 |
| Density kg/m$^3$ (lb/cuft) | 658 (41.1) | 617 (38.5) | 1.6 (0.1) | 660 (41.2) | 6.4 (0.4) |
| MWMX | 84.18 | 72.15 | 34.89 | 83.00 | 28.67 |
| | Composition Mole Fraction | | | | |
| OXYGEN (mole ppb) | 5,000 | 5,000 | — | 36 | 107,570 |
| CO | — | — | — | — | — |
| CO2 | — | — | — | — | — |
| ETHENE | — | — | 0.057 | 0.006 | 0.170 |
| PROPENE | — | — | — | — | — |
| 1-BUTENE | — | — | — | — | — |
| 1-HEXENE | 0.990 | — | 0.086 | 0.891 | 0.008 |
| HYDROGEN | — | — | 0.006 | 0.000 | 0.005 |
| ETHANE | — | — | 0.005 | 0.001 | 0.016 |
| PROPANE | — | — | — | — | — |
| N-BUTANE | — | — | — | — | — |
| N-HEXANE | 0.010 | — | 0.027 | 0.060 | 0.002 |
| IPENTANE | — | 1.000 | 0.015 | 0.034 | 0.006 |
| I-BUTANE | — | — | — | — | — |
| I-BUTENE | — | — | — | — | — |

TABLE 2a-continued

| | Stream No. (See FIG. 2) | | | | |
|---|---|---|---|---|---|
| | 238(a) | 238(b) | 252 | 214 | 240 |
| CIS-BTEN | — | — | — | — | — |
| METHANE | — | — | 0.003 | 0.000 | 0.004 |
| NITROGEN | — | — | 0.801 | 0.008 | 0.788 |
| WATER | — | — | — | — | — |

TABLE 2b

| | Stream No. (See FIG. 2) | | | | |
|---|---|---|---|---|---|
| | 222 | 210 | 236 | 234 | 216 |
| Temperature C. | 133.2 | 40.0 | −7.9 | −10.0 | 34.8 |
| Absolute Pressure kPa (psia) | 1746 (250.0) | 432 (62.8) | 1706 (247.0) | 1706 (247.0) | 2756 (400.0) |
| Flow kgmol/hr (lbmol/hr) | 2.0 (4.4) | 1.5 (3.4) | 15.5 (34.1) | 113.7 (250.6) | 59.6 (131.5) |
| Mass Flow kg/sec | 0.019 | 0.036 | 0.341 | 0.887 | 1.375 |
| Mass Flow lb/hr | 150 | 282 | 2,706 | 7,039 | 10,916 |
| Density kg/m³ (lb/cuft) | 17.6 (1.1) | 647 (40.4) | 692 (43.2) | 22.4 (1.4) | 660 (41.2) |
| MWMX | 34.22 | 83.56 | 79.27 | 28.09 | 83.01 |
| Composition Mole Fraction | | | | | |
| OXYGEN (mole ppb) | 1,649 | 23 | 121 | 1,857 | 36 |
| CO | — | — | — | — | — |
| CO2 | — | — | — | — | — |
| ETHENE | 0.059 | 0.005 | 0.037 | 0.062 | 0.006 |
| PROPENE | — | — | — | — | — |
| 1-BUTENE | — | — | — | — | — |
| 1-HEXENE | 0.078 | 0.694 | 0.628 | 0.003 | 0.886 |
| HYDROGEN | 0.006 | 0.000 | 0.000 | 0.006 | 0.000 |
| ETHANE | 0.006 | 0.001 | 0.005 | 0.006 | 0.001 |
| PROPANE | — | — | — | — | — |
| N-BUTANE | — | — | — | — | — |
| N-HEXANE | 0.024 | 0.255 | 0.195 | 0.001 | 0.065 |
| IPENTANE | 0.014 | 0.039 | 0.105 | 0.002 | 0.034 |
| I-BUTANE | — | — | — | — | — |
| I-BUTENE | — | — | — | — | — |
| CIS-BTEN | — | — | — | — | — |
| METHANE | 0.003 | 0.000 | 0.000 | 0.004 | 0.000 |
| NITROGEN | 0.811 | 0.006 | 0.029 | 0.917 | 0.008 |
| WATER | — | — | — | — | — |

Example 2

In the second simulation, the effect of varying stripper column pressure is shown when an embodiment of FIG. 2 is simulated assuming a gas-phase polyethylene process producing a LLDPE using a butene comonomer. The results, shown in Table 3, show how as the stripping column pressure increases the stripper column's volatile catalyst poison removal efficiency decreases, but the hydrocarbon recovery increased. Providing controls to operate the stripper column over a range of pressures in this manner may allow the stripper column to maximize hydrocarbon recovery when the fresh liquid hydrocarbon is very low in volatile catalyst poisons (for example zero or essentially zero). However, when the fresh liquid hydrocarbon shows to contain more volatile catalyst poisons, the stripper column can be operated in a mode to more optimally remove volatile catalyst poisons. In this example, the flow rate of the first portion of the high-pressure recycle gas (222) is assumed to be 45.3 kg/hr (100 lb/hr) at 127° C., the flow of purified nitrogen (246) is zero, and the flow of the recovered vent gas (234) is about 998 to 1011 kg/hr (2200-2230 lb/hr).

TABLE 3

| Predicted Component Redistribution | | | | |
|---|---|---|---|---|
| Stripper Column Operating Pressure kPa abs (psia) | | 520 (75) | 686 (100) | 863 (125) |
| Oxygen (mole ppm) in Fresh Liquid Hydrocarbon (226) | | 5 | 5 | 5 |
| Oxygen (mole ppm) in Degassed Liquid Hydrocarbon (216) | | 0.02 | 0.22 | 0.24 |
| Stripping Column Efficiency Changes in Degassed liquid hydrocarbon or Base Case without Stripping Column. | | 9.6% | 6.0% | 5.2% |
| ETHENE | kg/hr | −17.00 | −5.95 | −2.10 |
| PROPENE | kg/hr | — | — | — |
| 1-BUTENE | kg/hr | −1.38 | −0.45 | 0.05 |
| 1-HEXENE | kg/hr | — | — | — |
| HYDROGEN | kg/hr | −0.005 | 0.00 | 0.01 |
| ETHANE | kg/hr | −1.75 | −0.62 | −0.21 |
| PROPANE | kg/hr | — | — | — |
| N-BUTANE | kg/hr | −0.06 | −0.02 | 0.005 |
| N-HEXANE | kg/hr | — | — | — |
| IPENTANE | kg/hr | −0.32 | −0.04 | 0.20 |
| I-BUTANE | kg/hr | −0.09 | −0.03 | 0.00 |
| I-BUTENE | kg/hr | −0.18 | −0.06 | 0.005 |
| CIS-BTEN | kg/hr | −0.01 | −0.005 | 0.00 |
| METHANE | kg/hr | −0.15 | −0.09 | −0.04 |
| NITROGEN | kg/hr | −4.88 | 0.22 | 6.20 |

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for removing a volatile catalyst poison from a liquid hydrocarbon feed to a polymerization process, the method comprising the steps of:
    a) feeding a fresh liquid hydrocarbon to a stripper column;
    b) providing a process vent from a polymerization process;
    c) recycling the process vent in a vent recovery system to form a recycle gas;
    d) feeding a first portion of the recycle gas to the stripper column;
    e) removing a stripper vent gas and a stripper column tail from the stripper column; and
    f) feeding a degassed liquid hydrocarbon comprising the stripper column tail to the polymerization process.

2. The method of claim 1 further comprising the step of combining at least two independent liquid hydrocarbon streams to form the fresh liquid hydrocarbon.

3. The method of claim 1, further comprising the step of feeding the stripper vent gas to a vent recovery system.

4. The method of claim 1, further comprising the step of separating a process vent liquid from the process vent before recycling the process vent.

5. The method of claim 4, further comprising the step of combining the process vent liquid with the stripper column tail to form the degassed liquid hydrocarbon.

6. The method of claim 1 wherein the recycling step comprises the steps of:
    a) compressing the process vent in the vent recovery system to form a compressed recycle fluid; and
    b) separating the compressed recycle fluid to form the recycle gas and a recycle liquid.

7. The method of claim 6, further comprising the step of feeding the recycle liquid to the stripper column, or combining the recycle liquid with the stripper column tail to form the degassed hydrocarbon liquid.

8. The method of claim 6, wherein the stripper column comprises a chilled condenser in an upper portion of the stripper column, and further comprising the step of feeding the recycle liquid to the polymerization process.

9. The method of claim 1, further comprising the step of feeding a second portion of the recycle gas to the polymerization process, a product conveying system, a flare, or a combination thereof.

10. The method of claim 1, further comprising the step of feeding a fresh nitrogen gas to a lower portion of the stripper column, wherein the fresh nitrogen gas is fed in combination with the recycle gas.

11. The method of claim 1, further comprising the step of controlling the build-up of a light gas in the polymerization process, the process vent, or the recycle gas by venting a portion of the stripper vent gas, the process vent, or the recycle gas to a flare or a recovery system.

12. The method of claim 1, further comprising the step of removing a targeted catalyst poison from the fresh liquid hydrocarbon, the stripper column tail, the degassed liquid hydrocarbon, the stripper vent gas, or a process vent liquid in a purification bed.

13. The method of claim 1, further comprising the step of adjusting a stripper column pressure, a flow rate of the first portion of the recycle gas, a flow rate of the stripper vent gas, or combination thereof to increase the production of the stripper column tail or increase the removal of a volatile catalyst poison.

14. The method of claim 1, further comprising the step of controlling a stripper column pressure, a flow rate of the first portion of the recycle gas, a flow rate of the stripper vent gas, or combination thereof in response to a level of volatile catalyst poison measured in a gaseous process stream.

15. The method of claim 1, wherein the recycle gas comprises a medium-pressure recycle gas formed by the steps of:
    a) compressing the process vent to form a medium-pressure recycle fluid; and
    b) cooling and separating the medium-pressure recycle fluid to form a medium-pressure recycle liquid and the medium-pressure recycle gas.

16. The method of claim 15, further comprising the step of:
    a) feeding the medium-pressure recycle liquid to the stripper column, or
    b) combining the medium-pressure recycle liquid with the stripper column tail to form the degassed hydrocarbon liquid.

17. The method of claim 1, wherein the recycle gas comprises a high-pressure recycle gas formed by the steps of:
    a) compressing the process vent to form a medium-pressure recycle fluid;
    b) separating the medium-pressure recycle fluid to form a medium-pressure recycle liquid and a medium-pressure recycle gas; and
    c) compressing the medium-pressure recycle gas to form the high-pressure recycle gas.

18. The method of claim 17, further comprising the step of:
    a) feeding the medium-pressure recycle liquid to the stripper column, or
    b) combining the medium-pressure recycle liquid with the stripper column tail to form the degassed hydrocarbon liquid.

19. The method of claim 17, further comprising the steps of:
    a) separating a high-pressure recycle liquid from at least a portion of the high-pressure recycle gas; and
    b) feeding the high-pressure recycle liquid to the stripper column, combining the high-pressure recycle liquid with the stripper column tail to form the degassed hydrocarbon liquid, or feeding the high-pressure recycle liquid to the polymerization process.

20. The method of claim 17, further comprising the step of combining a purge bin vent and the stripper vent gas to form the process vent.

21. A method for removing volatile catalyst poisons from at least two liquid hydrocarbon feeds to a polymerization process, the method comprising the steps of:
    a) feeding at least two independent fresh liquid hydrocarbons to a stripper column;
    b) feeding a stripping gas to a lower portion of the stripper column;
    d) removing a stripper vent gas and a stripper column tail from the stripper column; and
    e) feeding the stripper column tail to the polymerization process.

22. The method of claim 21, wherein the at least two independent liquid hydrocarbon streams are combined to form a fresh liquid hydrocarbon before being fed into the stripper column.

23. The method of claim 1, further comprising the step of removing a targeted catalyst poison from the fresh liquid hydrocarbons or the degassed liquid hydrocarbon in a purification bed.

24. The method of claim 1, wherein the fresh liquid hydrocarbons comprise a liquid alkene, liquid alkane, or liquid cycloalkane.

25. The method of claim 1, further comprising the step of reducing a non-condensable gas concentration in a reactor gas by:
   a) feeding a reactor vent from the polymerization process to the stripper column; and
   b) venting a portion of the stripper vent gas from the polymerization process, wherein the stripper vent gas comprises the non-condensable gas.

26. The method of claim 1, further comprising the step of recycling the degassed liquid hydrocarbon to the stripper column.

27. The method of claim 1, further comprising the step of storing a portion of the degassed liquid hydrocarbon.

28. The method of claim 27, further comprising the step of feeding the stored portion of the degassed liquid hydrocarbon to the polymerization process.

29. A system for removing a volatile catalyst poison from a liquid hydrocarbon feed to a polymerization process, the system comprising:
   a) a process vent originating from a polymerization process;
   b) a vent recovery system in fluid communication with the process vent, wherein the vent recovery system compresses the process vent to form a recycle gas;
   c) a stripper column, wherein the stripper column receives a first portion of the recycle gas and a fresh liquid hydrocarbon, and wherein a stripper column tail and a stripper vent gas exit the stripper column; and
   d) a liquid feed pump in fluid communication with the stripper column, wherein the liquid feed pump pressurizes a degassed liquid hydrocarbon comprising the stripper column tail.

30. The system of claim 29, further comprising a low-pressure separator in fluid communication with the process vent, wherein the low-pressure separator separates a process vent liquid from the process vent.

31. The system of claim 29, wherein the vent recovery system comprises:
   a) a vent recovery compressor, wherein the vent recovery compressor compresses the process vent;
   b) a vent recovery cooler in fluid communication with and downstream of the vent recovery compressor, wherein the vent recovery cooler receives a compressed recycle fluid from the vent recovery compressor; and
   c) a medium-pressure separator in fluid communication with and downstream of the vent recovery cooler, wherein the medium-pressure separator separates a recycle liquid from the compressed and cooled recycle fluid.

32. The system of claim 31, wherein a lower portion of the medium-pressure separator is in fluid communication with the stripper column, such that the recycle liquid flows to the stripper column.

33. The system of claim 31, wherein the stripper column comprises a chilled condenser in an upper portion of the stripper column, and wherein the recycle liquid flows to the polymerization process.

34. The system of claim 29, wherein the system comprises:
   a polymer purge bin, wherein absorbed hydrocarbons are removed from a polymer product;
   the vent recovery system comprises a first stage compressor in fluid communication with the purge bin, wherein the first stage compressor receives a process vent exiting the purge bin, and wherein the vent recovery system produces a high-pressure recycle gas; and
   wherein the stripper column receives a fresh liquid hydrocarbon and a first portion of the high-pressure recycle gas.

35. The system of claim 34, wherein the vent recovery system further comprises a medium-pressure separator, a second stage compressor, and a high-pressure separator, and wherein a lower portion of the high-pressure separator is in fluid communication with the stripper column, such that a high-pressure recycle liquid flows from the high-pressure separator to the stripper column.

36. The system of claim 35, wherein a lower portion of the medium-pressure separator is in fluid communication with the liquid feed pump or the stripper column, such that when the lower portion of the medium-pressure separator is in fluid communication with the liquid feed pump, a medium-pressure recycle liquid flows from the medium-pressure separator to the suction of the liquid feed pump, or such that when the lower portion of the medium-pressure separator is in fluid communication with the stripper column, a medium-pressure recycle liquid flows from the medium-pressure separator to the stripper column.

37. The system of claim 34, wherein the vent recovery system further comprises a medium-pressure separator, a second stage compressor, a first high-pressure chiller, a first high-pressure separator, a second high-pressure chiller and a second high-pressure separator, a lower portion of the first high-pressure separator is in fluid communication with the stripper column, such that a first high-pressure recycle liquid flows from the high-pressure separator to the stripper column, and a lower portion of the second high-pressure separator is in fluid communication with the polymerization process, such that a second high-pressure recycle liquid flows from the second high-pressure separator to the polymerization process.

38. The system of claim 29, wherein the vent recovery system is in fluid communication with the stripper column, such that the vent recovery system receives the stripper vent gas.

39. The system of claim 29, further comprising a purification bed, in fluid communication with the fresh liquid hydrocarbon, the stripper column tail, or the degassed liquid hydrocarbon.

40. The system of claim 29, further comprising:
   a) a reactor vent in fluid communication with the stripper column; and
   b) a light gas vent in fluid communication with the stripper column such that a portion of the stripper vent gas is removed from the polymerization process.

41. The system of claim 29, further comprising a degassed liquid recycle, wherein the degassed liquid recycle is fed to the stripper column, and wherein the degassed liquid recycle comprises a portion of the degassed liquid hydrocarbon.

42. The system of claim 29, further comprising a liquid storage vessel, wherein a portion of the degassed liquid hydrocarbon is stored.

43. The system of claim 29, further comprising a liquid surge vessel in fluid communication with a lower portion of the stripper column.

* * * * *